Jan. 9, 1962  N. V. ROSS  3,016,412

HIGH-TEMPERATURE THERMOCOUPLE DEVICE

Filed March 27, 1958

Inventor
NICHOLAS V. ROSS
his Attorney.

United States Patent Office 3,016,412
Patented Jan. 9, 1962

3,016,412
HIGH-TEMPERATURE THERMOCOUPLE DEVICE
Nicholas V. Ross, Youngstown, Ohio, assignor to Ajax Magnethermic Corporation, a corporation of Ohio
Filed Mar. 27, 1958, Ser. No. 724,289
6 Claims. (Cl. 136—4)

This invention relates to a thermocouple device, and particularly to high-temperature thermocouples capable of measuring the temperatures of heated articles, such as steel or alloy billets, ingots, and the like.

The prior thermocouple devices heretofore used for measuring the temperatures of such articles are arranged so that, during operation, their bi-metallic junctions are engaged with the surfaces of the articles of which the temperatures are to be measured. Direct contact between the junctions and articles was believed necessary for heating the junctions substantially to the same temperatures as those of the surfaces of which the temperatures were to be measured. This prior type of thermocouple provides accurate measurements if the surface to which the junction is applied is in clean and unscaled condition and the junction itself is free from scale, dirt, and like extraneous matter.

However, quite often the surface to which the junction is applied is, or during measurement becomes, contaminated with substantial amounts of scale, dirt, and the like, each of which directly affects the transfer of heat to the thermocouple junction. Also, foreign matter on the article surface frequently is picked up by the thermocouple junction. In all such events, inaccurate measurements frequently result so that full reliance cannot be had in the instrument.

In accordance with the present invention, provision is made so that the reading can be taken from a surface area of the metal billet or article by a thermocouple junction placed very close to the metal surface at that area but constrained to spaced relation therefrom so that the junction does not come into contact with the surface, or with scale or dirt on the surface, at that area, and, at the same time, the surface area to which the thermocouple junction is exposed, and the junction itself, are isolated from the outside atmosphere so that a negligible amount of oxygen or other scale producing gases are present, and therefore, little or no scale can be formed on that area of the billet surface during the measuring operation. Any scale formed thereon during the measuring operation is so small as to be negligible in its effect on the heating of the thermocouple junction.

It has long been well known in connection with thermocouples that scale formation on the article surface and contamination of the junction by scale, dirt, or other foreign matter picked up by the junction result in erroneous readings.

On the other hand, it has been recognized that the energy transmitted by radiation from a source to detector varies in inverse relation to the distance between the source and detector.

The problem, therefore, is to avoid scale and foreign matter on the surface area of the article and junction while the temperature is being measured, and, at the same time, assure that the junction is heated substantially to the same temperature as the surface area from which the measurement is being taken.

Broadly, this is accomplished by means of a refractory or highly heat resistant supporting body having a small shallow cavity opening at one of its ends through a wall of the body, with a thermocouple mounted with its junction disposed in the cavity close to, but spaced inwardly from, the open end of the cavity.

The supporting body is arranged so that the margin of the external wall surface defining the open end of the cavity can be juxtaposed against the surface area from which the temperature measurement is to be taken and can form a sufficiently effective seal therewith to exclude the entrance of any appreciable amount of extraneous air therebetween, thus providing, with the surface area, an isolated pocket in which the surface area and junction are exposed during temperature measurement. As a result, if a surface from which the temperature measurement is to be taken is relatively clean and free from scale at the time the thermocouple is applied, it remains in that condition during the taking of the reading, because sufficient outside air or other gases to cause oxidation or sealing of the surface area or contamination of the thermocouple cannot enter the isolated pocket formed by the cavity and the article surface.

Since there is no contact of the junction with the surface area and there is no appreciable volume of extraneous air or oxidizing or other deleterious gaseous media in the pocket during the measurement, the surfaces of both the junction and area of the article remain clean and uncontaminated. Again, since the junction is located so close to the surface area, and both surfaces are clean and isolated from outside air and drafts, the junction reaches substantially the temperature of the surface area, the resultant heating of the junction being exceedingly rapid and accurate; in fact, substantially as rapid and accurate as would be the case were the junction placed against a properly prepared and clean billet surface. The junction reaches substantially the same temperature as it would by direct contact with the surface area, largely because of the smallness of the space or volume of the isolated pocket, the closeness of the junction to the surface area, the clean condition of the surfaces, and the other heat transfer effects hereinafter more fully set forth.

Various objects and advantages of the invention will become apparent from the following description wherein reference is made to the drawing illustrating preferred embodiments of the present invention, and wherein.

Figure 1:
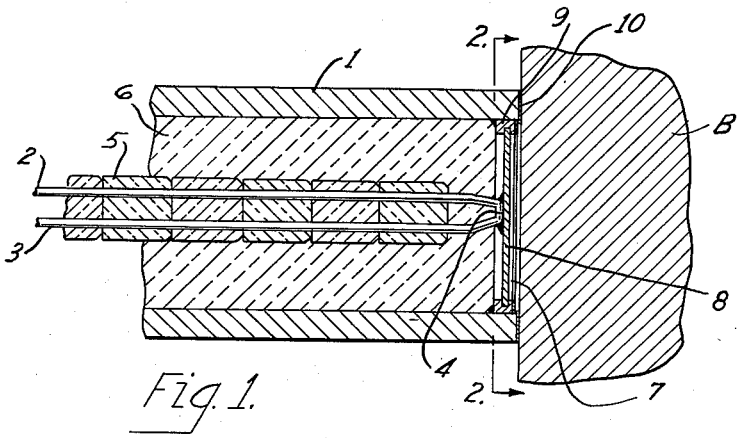
FIG. 1 is a fragmentary longitudinal sectional view through a thermocouple embodying the principles of the present invention, and showing the same as applied to a billet of which the surface temperature is to be measured.
Figure 2:
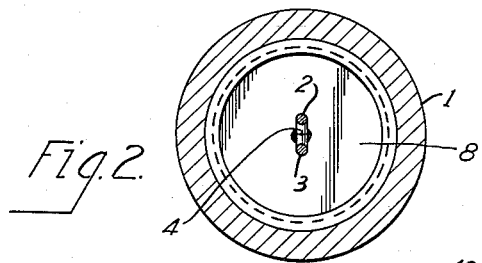
FIG. 2 is a cross-sectional view taken on the line 2—2 in FIG. 1.

Referring first to FIG. 1, the thermocouple device of the present invention comprises an elongated tubular body 1 of refractory, or high heat resistant, material, such as stainless steel or Inconel, a nickel-chrome alloy.

Mounted within the body is a pair of thermocouple lead wires 2 and 3 which are joined together to provide the usual bi-metallic thermocouple junction 4.

The lead wires 2 and 3 are provided with suitable porcelain spacing electric insulators 5 which maintain them in laterally spaced relation with respect to each other. They are disposed within the tubular body 1 and suitably thermally insulated from the walls thereof by insulation 6 of high thermal insulating properties.

The body 1 has one end which is adapted to be juxtaposed against the surface of the billet or other article B of which a surface temperature measurement is to be taken.

In that end of the body 1 is a small cavity, indicated generally at 7, which is preferably extremely shallow and opens through the end of the body 1. The junction 4 is positioned in the cavity in spaced relation rearwardly from the open end thereof, so that it is subjected to the heat conditions created in the cavity 7.

Because the cavity is extremely shallow, and further, for the reasons hereinafter appearing, the temperature to which the thermocouple junction 4 is raised is substantially the same as to which it would be raised were it in contact with the surface of the article or billet B.

For assuring that the thermocouple junction 4 is heated quickly to the temperature within the cavity 7, the junction is arranged in intimate heat-conducting relationship to a shield member 8, preferably by bonding the junction 4 to the rear face of the shield member 8 by a metallic bond, such as by welding or the like.

The shield member 8 preferably is located at the rear of the cavity and is composed of high heat-resistant metal of good heat-conducting properties, such as stainless steel, Inconel, platinum, or the like.

In order to support the shield member 8 within the cavity, a suitable collar 9 is bonded to the inner wall surface of the tubular body 1, the collar 9 having a groove which accommodates the margin of the shield member 8 and secures it fixedly in place. The margin of the shield member 8 may be bonded to the collar 9, if desired.

A ceramic coat 10 can be provided over the end of the tube 1 and the outer end surface of the collar 9.

The shield member 8, as mentioned, is one having good heat-conducting properties so that it readily conducts and transmits to the junction 4 the heat to which it itself is subjected.

The body 1 is preferably mounted in the conventional manner of any spring-loaded pyrometers thermocouple which is to be pressed firmly endwise against a surface of an article of which the temperature is to be measured.

The junction 4 of the thermocouple is positioned in the cavity so that, when the end of the body 1 is pressed against the billet surface, the junction 4 is spaced somewhat from the surface of the billet B, for example, from about 1/16" to 1/4". However, since the member 8 is very thin and has an extremely large forward area relative to the area of the junction, it can soon reach a temperature substantially that of the billet and conduct the received heat to the junction so that the temperature reached by the junction quickly becomes substantially the same as that of the engaged surface of the billet B.

It is desirable that the cavity be as small and shallow as possible in order to assure the positioning of the junction 4 as near the surface of the billet B as practicable without the danger of the junction 4 or shield member 8 touching the billet surface, or becoming contaminated by any pick-up from the billet surface. Also, it is desirable that the cavity be small and that the wall of the body at the cavity entrance fit the billet surface sufficiently closely so as to limit the amount of air initially present in the pocket and to constrain the entry of outside air during temperature measurement.

In use, the end of the body 1 is disposed against the surface of which the temperature is to be read and is held firmly pressed thereagainst by a suitable spring, not shown, or other means. Thus the junction 4 is disposed in closely spaced intimate heat-exchange relationship to the billet. The entrance end fits the billet surface so that the surface area from which the temperature is to be read, and also the junction, are protected from drafts and from scale-causing extraneous atmosphere, and other contaminants.

It has been found that with this arrangement, the very small amount of air trapped in the pocket formed by the cavity 7 and billet surface is sufficient to prevent the entrance of any additional air into the cavity so that the only oxidizing effect can be the very minute amount of oxygen contained in the small pocket of initially entrapped air. This cannot produce sufficient scale to cause any appreciable effect.

Before making the temperature measurement, it is preferable to put the thermocouple into a position relative to the billet B wherein the body 1, at least at its operating end, is brought up to proper operating temperature.

This occurs very quickly. The forward face of the shield member 8 likewise is spaced from the open end of the cavity so that it does not come into contact with the surface of the billet or pick up any scale or dirt therefrom which would be sufficient to cause false readings. The shield member 8 heats up extremely rapidly inasmuch as its mass is quite small relative to its exposed surface area, its position is close to the billet surface, and its thermal conductivity is high. It receives heat by convection of the gases entrapped in the pocket or cavity, by direct radiation from the billet surface, and by conduction from the walls of the body 1 and the collar 9. All of this heat is rapidly transmitted to the thermocouple junction 4 by conduction through the shield member 8. Since the area of the shield member 8 is large relative to the area of the junction facing toward the billet, and since the shield is extremely thin, the termocouple junction receives heat substantially as readily as though it were in contact with the billet, with the surfaces of the billet and the thermocouple in proper clean operating condition.

In some instances, the shield member 8 can be omitted, but in such instances, it is desirable that the portion of the wires forming the junction 4 of the thermocouple be made wide so as to provide a large frontal area for exposure toward the billet B. This form, however, is not as desirable inasmuch as there is not such a large heat-gathering surface and there is danger of damage to the exposed thermocouple junction by contact with other objects. Furthermore, after being heated, the junction is directly exposed to the air when the body is removed from the heated billet surface, whereas, with the shield member, the thermocouple junction itself is not exposed to the outside air.

Figure 3:
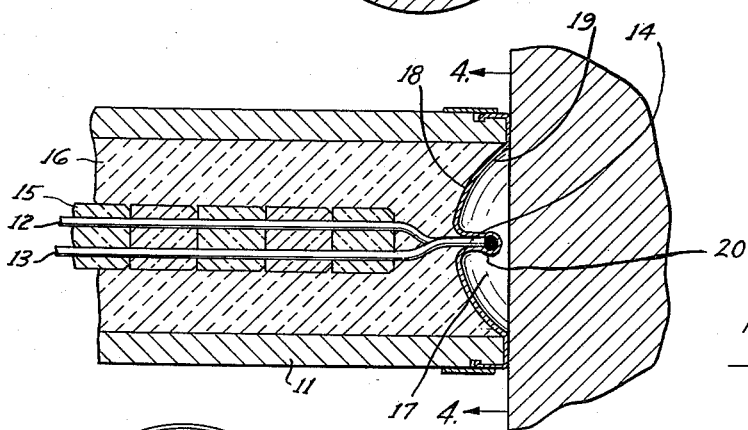
FIG. 3 is a sectional view, similar to FIG. 1, illustrating a modification of the invention.
Figure 4:
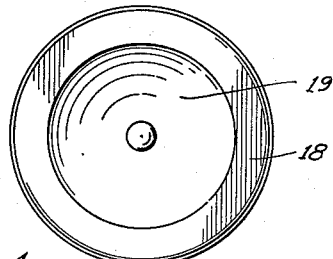
FIG. 4 is a view taken on the line 4—4 in FIG. 3.

In some instances, it is desirable to concentrate heat even more, and for this purpose a thermocouple device such as illustrated in FIG. 3 is employed. This thermocouple device is essentially the same as the thermocouple device above described except for the manner in which the junction is arranged for heating. Thus, in the form illustrated in FIGS. 3 and 4, the body 11 contains the lead wires 12 and 13, the junction 14, insulating spacers 15, and insulating material 16, corresponding to the body 1, leads 2 and 3, junction 4, the insulators 5, and the insulation 6, hereinbefore described. The difference in the modification resides in the formation of the cavity and the shield member and their location with respect to the junction 14.

As illustrated, the cavity, indicated at 17, is somewhat deeper than that indicated at 7. A shield member 18 is provided and is so arranged that its forward face is in the form of a heat reflector having a heat reflecting or re-radiating surface 19 which is concave forwardly toward the billet or surface of which the temperature is to be measured. The surface 19 reflects or re-radiates heat from the billet forwardly, and concentrates the heat at a location spaced forwardly of the reflecting surface but rearwardly of the open end of the cavity 17. Preferably, the reflecting surface 19 is made parabolic, so as to concentrate the radiated heat at a very small zone or focal point, and the junction 14 is located at or near the focal point. For this purpose, the shield member 18 is provided with a relatively small diameter, central, forwardly protruding, tubular portion 20 which is open rearwardly. The leads 12 and 13 enter the portion 20 from the rear and the junction is disposed at the forward end of the portion 20, which forward end is substantially at the focal point of the re-radiating surface 19. The junction preferably is welded or otherwise fixedly bonded in good heat-conducting relationship to the wall of the protruding portion 20 near its forward end.

This form of the invention has the advantage that the thermocouple junction can be as close to the surface of the billet as in the previous form, or farther therefrom.

At the same time, however, the arrangement of the forwardly concave reflecting or radiating surface causes the re-radiation of the heat received thereon to, and concentration thereof accurately at, the point at which the thermocouple junction is located. Thus, the surface of the forwardly protruding portion at which the junction 14 is located receives heat by radiation directly from the billet, by convection by hot gases within the pocket, by conduction through the element 19, and by re-radiation to the forward location by the surface 19.

The member 18 preferably is formed of thin sheet metal of high heat resistance and of good heat conducting and radiating properties. It may be formed of platinum, if desired.

The shape of the forward surface can be varied, depending upon the location desired for the thermocouple junction and the concentration of the radiated heat by the parabolic reflecting surface.

With the member 18 formed as a concentrating reflector, the junction can be placed farther from the billet surface, the degree of concentration offsetting the loss due to increased distance between the junction and heat source.

In general, the smaller the cavity is, and the less the mass of the shield member 18 is, the more prompt and accurate is the response of the thermocouple device.

Having thus described my invention, I claim:

1. A thermocouple device including a body having a forward wall adapted to be juxtaposed against the surface of an article of which the temperature is to be measured and having a relatively shallow end cavity facing forwardly toward said wall, a thermocouple including a relatively small, unitary thermocouple junction positioned in the cavity so as to be responsive to heat conditions created in the cavity, said junction being positioned, endwise of the cavity, inwardly from, and in closely spaced relation to the forward end so as to be in closely spaced relation to said surface of the article when the wall of the body is so juxtaposed, and, in addition to said junction, a heat conducting shield member of non-thermoelectric material having a portion in intimate heat conducting relation to the junction and disposed forwardly thereof and extending outwardly, transversely of the cavity, therefrom, and sealing the cavity forwardly of the junction, said shield member having a forward face exposed in, and facing toward the forward end of the cavity, and spaced rearwardly from said forward end and rearwardly from said juxtaposed wall and said junction is juxtaposed against the rear face of the shield member.

2. A thermocouple device including a body having a forward wall adapted to be juxtaposed against the surface of an article of which the temperature is to be measured and having a relatively shallow end cavity facing forwardly toward said wall, a thermocouple including a relatively small, unitary thermocouple junction positioned in the cavity so as to be responsive to heat conditions created in the cavity, said junction being positioned, endwise of the cavity, inwardly from, and in closely spaced relation to the forward end so as to be in closely spaced relation to said surface of the article when the wall of the body is so juxtaposed, and, in addition to said junction, a heat conducting shield member of non-thermoelectric material having a portion in intimate heat conducting relation to the junction and disposed forwardly thereof and extending outwardly, transversely of the cavity, therefrom, and sealing the cavity forwardly of the junction, said shield member having a forward face in the form of a forwardly concave heat-reflecting surface arranged to concentrate heat radiations from its surface at a location in the cavity spaced forwardly of the reflecting surface, and rearwardly of said forward end, and said junction is positioned at said location.

3. A thermocouple device according to claim 2 wherein the concave surface is generally parabolic and the location is at least close to the focal point of the concave surface.

4. A thermocouple device according to claim 2 wherein the shield member has a hollow, rearwardly open, central portion protruding forwardly into said location in spaced relation to the concave surface, and the junction is disposed within said portion and in intimate heat-conducting relation thereto.

5. A thermocouple device including a body having a forward wall portion adapted to be juxtaposed against the surface of an article of which the temperature is to be measured, said body providing a relatively shallow end cavity at the forward portion thereof laterally bounded by said forward wall portion, a heat conductive shield member connected to said body and positioned in said cavity transversely to the forward wall portion of said body and rearwardly of the end of said forward wall portion and having a forward face closely adjacent the surface of said article, and thermocouple means including a relatively small, unitary thermocouple junction positioned in said cavity contiguous to the rear face of said shield member, whereby heat from said article will be readily transmitted from said article through said shield to said thermocouple junction, accurately measuring the temperature of said article.

6. A thermocouple device including a body having a forward wall portion adapted to abut the surface of an article of which the temperature is to be measured, insulation means positioned within said body and terminating rearwardly of said forward wall portion, said forward wall portion and said insulation forming a relatively shallow end cavity with said article when said forward wall portion abuts said article, a heat conducting shield member of non-thermoelectric material positioned in said cavity having a forward face closely adjacent said article, said shield member being connected to said body, said shield member sealing that portion of the cavity between said shield member and said insulation, and thermocouple means positioned in said insulation, said thermocouple means including a unitary thermocouple junction extending into said cavity contiguous to the rear side of said shield member.

References Cited in the file of this patent

UNITED STATES PATENTS

| | | |
|---|---|---|
| 2,517,053 | Thompson | Aug. 1, 1950 |
| 2,581,229 | Battey | Jan. 1, 1952 |
| 2,677,711 | Ray | May 4, 1954 |
| 2,698,872 | Broffitt | Jan. 4, 1955 |
| 2,839,594 | Schneidersmann | June 17, 1958 |

FOREIGN PATENTS

| | | |
|---|---|---|
| 511,890 | Canada | Apr. 12, 1955 |